United States Patent Office 3,678,000
Patented July 18, 1972

3,678,000
POLYPROPYLENE STABILIZED WITH METAL SALTS OF N - HYDROXYALKYLBENZYL ALKYLENEPOLYAMINES
John Howard Adams, San Rafael, Calif., assignor to Chevron Research Company, San Francisco, Calif.
No Drawing. Application Dec. 6, 1968, Ser. No. 781,996, which is a continuation-in-part of application Ser. No. 714,773, Mar. 21, 1968. Divided and this application Sept. 25, 1970, Ser. No. 75,686
Int. Cl. C08f 45/62
U.S. Cl. 260—45.75 N                5 Claims

ABSTRACT OF THE DISCLOSURE

Polypropylene compositions stabilized against photodegradation by divalent metal salts of polyamines having the formula:

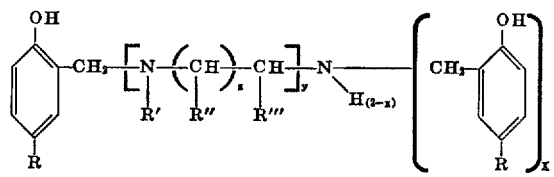

wherein R is an alkyl group of about 5 to about 15 carbon atoms; R' is H or

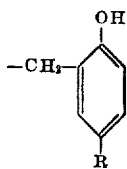

R" and R'" which may be alike or different are H or alkyl groups having less than 5 carbon atoms each; z is an integer in the range of 1 to 12; y is an integer in the range of 1 to 4; x is 0, 1 or 2 and the number of mols of divalent metal per mol of salt is in the range of about 0.5 to 3.5, inclusive.

CROSS REFERENCE TO RELATED APPLICATIONS

This application is a division of John Howard Adams copending application Ser. No. 781,996, filed Dec. 6, 1968, now abandoned, which, in turn, is a continuation-in-part of John Howard Adams U.S. application Ser. No. 714,-773, filed Mar. 21, 1968, now abandoned.

FIELD OF INVENTION

This invention concerns metal salts of linear alkylenepolyamines in which at least one of the nitrogen atoms is substituted with a hydroxy- and alkyl-substituted benzyl radical and their use as photostabilizers for polypropylene.

DESCRIPTION OF INVENTION

The novel stabilizers of this invention are metal salts of polyamines having the formula:

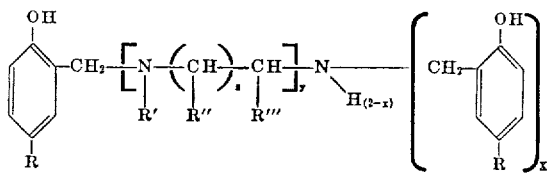

wherein R is an alkyl group of about 5 to about 15 carbon atoms; R' is H or

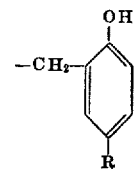

R" and R'" which may be alike or different are H or alkyl groups having less than 5 carbon atoms each; z is an integer in the range of 1 to 12; y is an integer in the range of 1 to 4; and x is 0, 1 or 2.

The preferred compounds of the invention for their effectiveness as photostabilizers for polypropylene are nickel salts of polyamines of the formula:

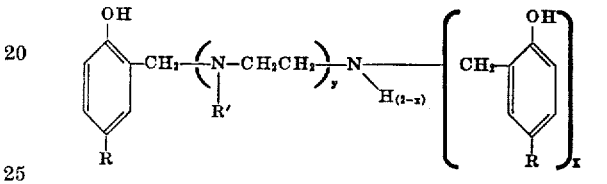

wherein R is alkyl of about 5 to about 15 carbon atoms, R' is H or

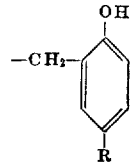

y is an integer in the range of 1 to 4, inclusive, and x is 0, 1 or 2. Preferably, y is 1 or 2. The number of nickel atoms per mol of salt is in the range of about 0.5 to 3.5, inclusive.

The maximum number of 2-hydroxy-5-alkylbenzyl groups is two plus the number of nitrogen atoms in the salt. Thus, there may be 1 to 7 of such groups present. Two of these groups may be attached to a single nitrogen atom. The alkyl groups (R) may be the same or different. They may be branched or straight-chain. Examples of such alkyl groups are pentyl, hexyl, heptyl, octyl, nonyl, decyl, undecyl, dodecyl, tridecyl, tetradecyl and pentadecyl. Preferred R groups are those having 8 to 15 carbon atoms. Salts wherein R is octyl or dodecyl are particularly preferred because of the availability of their phenolic precursors and their superior polymer compatability and performance as stabilizers.

Salts represented by the above formula are the metal, preferably nickel salts of:

N-(2-hydroxy-5-octylbenzyl) ethylenediamine,
N-(2-hydroxy-5-decylbenzyl) ethylenediamine,
N-(2-hydroxy-5-dodecylbenzyl) ethylenediamine,
N-(2-hydroxy-5-tridecylbenzyl) ethylenediamine,
N,N'-di(2-hydroxy-5-nonylbenzyl) ethylenediamine,
N,N'-di(2-hydroxy-5-dodecylbenzyl) ethylenediamine,
N,N'-di(2-hydroxy-5-pentadecylbenzyl) ethylenediamine,
N-(2-hydroxy-5-octylbenzyl)-N'-(2-hydroxy-5-dodecylbenzyl) ethylenediamine,
1-(2'-hydroxy-5'-octylbenzyl) diethylenetriamine,
1-(2'-hydroxy-5'-undecylbenzyl) diethylenetriamine,
1-(2'-hydroxy-5'-tetradecylbenzyl) diethylenetriamine,
1,4-di(2'-hydroxy-5'-dodecylbenzyl) diethylenetriamine,
1,4-di(2'-hydroxy-5'-pentadecylbenzyl) diethylenetriamine,
1,7-di(2'-hydroxy-5'-decylbenzyl) diethylenetriamine, 1-(2'-hydroxy-5'-tetradecylbenzyl)-4-(2''-hydroxy-5''-octylbenzyl) diethylenetriamine,
1,1,4-tri(2'-hydroxy-5'-dodecylbenzyl) diethylenetriamine,
1,4,7-tri(2'-hydroxy-5'-tridecylbenzyl) diethylenetriamine,
1,4-di-(2'-hydroxy-5'-decylbenzyl)-7-(2''-hydroxy-5''-tetradecylbenzyl) diethylenetriamine,
1,10-di(2'-hydroxy-5'-pentylbenzyl) triethylenetetramine,
1,7,13-tri(2'-hydroxy-5'-hexylbenzyl) tetraethylenepentamine,
1,4,7,10,13-penta-(2'-hydroxy-5'-octylbenzyl) tetraethylenepentamine,
1,1,13,13-tetra-(2'-hydroxy-5'-dodecylbenzyl) tetraethylenepentamine,
1,1,4,7,10,10-hexa(2'-hydroxy-5'-pentylbenzyl) triethylenetetramine and
1 - (2' - hydroxy - 5' - heptylbenzyl) - 4 - (2'' - hydroxy - 5'' - nonylbenzyl) - 7 - (2''' - hydroxy - 5''' - undecylbenzyl) - 10 - (2$^{iv}$ - hydroxy - 5$^{iv}$ - tridecylbenzyl) - 13 - (2$^v$ - hydroxy - 5$^v$ - pentadecylbenzyl) tetraethylenepentamine.

Also included are metal, preferably nickel salts of higher alkylene polyamines as follows:

N,N'-(2-hydroxy-5-octylbenzyl)-pentane-1,5-diamine;
N-(2-hydroxy-5-decylbenzyl) dodecane-1,12-diamine;
N,N'-(2-hydroxy-5-dodecylbenzyl) propane-1,2-diamine;
1,4-di(z'-hydroxy-5'-octylbenzyl)-2,5-dimethyldiethylenetriamine;

1,4,7-tri-(2'-hydroxy-5-tetradecylbenzyl)-2,5,8-triethyl diethylenetriamine;
N,N,N',N'-tetra(2-hydroxy-5-pentylbenzyl-octane-1,8-diamine.

The salts of this invention may be prepared by first preparing the N-(hydroxyalkylbenzyl) alkylenepolyamine compound and then forming its metal salt. The ethylenic phenolic polyamines of the above formula may be made by reacting a linear ethylenepolyamine having 1 to 4 ethylene groups and 2 to 5 nitrogen atoms (ethylenediamine, triethylenetetramine and tetraethylenepentamine), with formaldehyde and a p-alkylphenol wherein the alkyl group contains from about 5 to about 15 carbon atoms. In the case of the higher alkylene polyamines the reaction is the same. The addition sequence of the reactants is not critical within reasonable times and temperatures, and in the absence of catalysts. Equimolar amounts of formaldehyde and phenol will be used in the reaction. The number of mols of formaldehyde and alkylphenol per mol of polyamine will be in the range of 1 to 7, inclusive.

The preparation of these N-(hydroxyalkylbenzyl) alkylenepolyamines will normally be carried out at temperatures in the range of about 50 to 100° C. The pressure is not critical—therefore autogenous or atmospheric pressures will be used. This preparation may be carried out neat (without solvents) or with such solvents as benzene, toluene, methanol, ethanol, and carbontetrachloride.

The metal salts of these N-(hydroxyalkylbenzyl) alkylene polyamines as illustrated by the nickel salts of N-(hydroxyalkylbenzyl) ethylenepolyamines may be formed by reacting the phenolic polyamines with a nickel salt, preferably an inorganic nickel salt. First the N-(hydroxyalkylbenzyl) ethylenepolyamine is neutralized with a base, e.g., sodium methoxide, and then a nickel salt as the chloride is added. The resulting organic salt precipitates and is removed by filtration. The by-product sodium chloride is removed by a water wash.

The nickel compounds formed by the recation of the N-(hydroxyalkylbenzyl) ethylenepolyamines and a nickel salt have two general type structures. In the first type, both bonds of the divalent nickel are joined to one molecule of the phenolicamino compound. One form of this internal bonding is illustrated by the following formula:

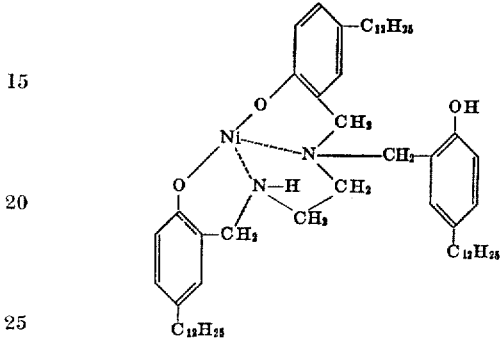

In the second type of compound, the two valences of the nickel atom are satisfied by two different molecules of the phenolicamino compound. This results in a larger molecular weight than otherwise expected. One form of this interbonding is illustrated by the formula:

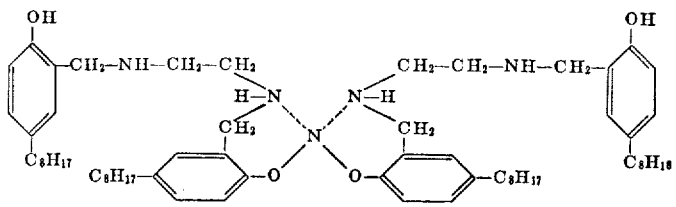

The dotted lines in the above formulas represent nitrogen to nickel coordinate bonds. Many variations of both inter and intra bonding are possible, and these variations permit a wide variation in the molar amount of nickel that may be incorporated in the module. At the minimum, with nickel interbonding, one-half mole of nickel combines with one molecule of a phenolic-amino compound. At the other extreme, the number of nickel atoms is one-half the number of phenolic groups in the molecule, e.g., 3.5 nickel atoms in hepta - (2 - hydroxy - 5 - alkylbenzyl) tetraethylenepentamine.

The following examples illustrate various salts of this invention and a specific method for preparing them. These examples are in no manner intended to limit the invention described herein. Unless otherwise indicated, percentages are by weight.

EXAMPLE I (a) Preparation of di-(2-hydroxy-5-octylbenzyl) ethylenediamine

In a 250-ml. 3-necked flask fitted with stirrer, reflux condenser and addition funnel, 20.6 g. of p-octylphenol was heated to about 90° C. Then 3.0 g. ethylenediamine was added and the mixture stirred for 15 minutes at 80–90° C. Aqueous formaldehyde, 8.1 grams of 37% concentration, was added dropwise at 90° C. The reaction mixture was stirred for two additional hours at about 90° C. At the end of this time, a Dean-Stark adapter was inserted in the reflux condenser and benzene was added to the reaction mixture. Water was removed by the azeotropic distillation with benzene. After all of the water was removed, the reaction mixture was poured into a container and dried to a constant weight of 26.6 g. The light yellow, thick, oil-like product had the following element analysis.

Calculated for $C_{32}H_{52}N_2O_2$: C, 77.4; H, 10.5; N, 5.6; M.W., 496. Found: C, 77.5; H, 10.3; N, 5.5; M.W., (ThermoNAM method) 545.

The infrared spectrum of this product had a small peak at 3600 cm.$^{-1}$, a broad peak centered at 3300 cm.$^{-1}$, a large peak at 2940 cm.$^{-1}$ and a medium sized doublet at 1600 cm.$^{-1}$.

An NMR spectrum was obtained of this product dissolved in deuterated chloroform ($CDCl_3$). This spectrum had singlet proton peaks at 0.68, 1.29, 1.64, 2.71, 3.61, 3.84, and 6.23 (broad) and a multiplet at 6.6 to 7.2 p.p.m. in reference to tetramethylsilane. The area under these peaks was proportional to the number of protons in either N,N- or N,N'-di(2-hydroxy-5-octylbenzyl) ethylenediamine. The presence of a peak at 3.6 p.p.m. and at 3.8 p.p.m. (the region of resonance of a proton of a methylene group located between an aryl group and a nitrogen atom) indicates that the product is a mixture of both of these compounds.

A mass spectrum analysis of the product showed that there were two large mass ion peaks at 247 and 465. These peaks results from the following two fragments:

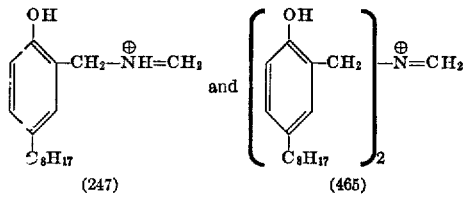

This analysis also indicates that the product of the experiment is a mixture of N,N-di(2-hydroxy-5-octylbenzyl) ethylenediamine and N,N'-di(2-hydroxy-5-octylbenzyl) ethylenediamine.

(b) Preparation of the nickel salt of di(2-hydroxy-5-octylbenzyl) ethylenediamine The product (2.5 g.) of Example 1a was dissolved in methanol containing 0.54 g. sodium methoxide and heated to reflux for one-half hour. After cooling to room temperature, 1.20 g. nickelous chloride hydrate in methanol was added and the mixture was stirred for an additional one-half hour at 25°. The reaction mixture was then poured into water. The resulting precipitate was filtered and washed with water until no more chloride ion was detected in the wash water by aqueous silver nitrate. The product was then dried to a constant weight of 2.55 g. in a vacuum oven. The resulting light green powder had a M.P. 120–155° C. Its element analysis was:

Calculated for $C_{32}H_{50}N_2O_2Ni$: C, 69.5; H, 9.1; N, 5.1; Ni, 10.6; M.W. 553. Found: C, 67.29; H, 9.49; N, 4.61; Ni, 8.54; M.W. 915.

The infrared spectrum of this salt differs somewhat from that of the parent compound; particularly in the lower intensity of 3300 cm.$^{-1}$ band and the conversion of the doublet band at 1600 cm.$^{-1}$ to a broad, strong single peak.

Other nickel salts of this invention were prepared by the general method described in Example 1. These nickel salts are listed in Table I.

TABLE I

| Example No. | Polyamine Type | Polyamine Amt. (g). | p-Alkylphenol [1] Type | p-Alkylphenol Amt. (g.) | Mole ratio, $NiCl_2 \cdot 6H_2O$/phenolic/polyamine In the reaction | Mole ratio, $NiCl_2 \cdot 6H_2O$/phenolic/polyamine In the product | Product analysis, wt. percent Mol. wt. | C | H | N | Ni |
|---|---|---|---|---|---|---|---|---|---|---|---|
| 2 | EDA | 6.0 | Octyl | 20.6 | 0.5/1.0/1.0 | 0.8/2.0/1.0 | 830 | 66.3 | 8.7 | 4.8 | 8.2 |
| 3 | EDA | 6.0 | do | 20.6 | 1.0/1.0/1.0 | 1.0/1.7/1.0 | 1,040 | 61.9 | 7.8 | 5.4 | 10.9 |
| 4 | EDA | 1.5 | do | 20.6 | 2.0/4.0/1.0 | 0.9/4.0/1.0 | 1,005 | 71.2 | 9.2 | 3.32 | 6.2 |
| 5 | DETA | 5.16 | do | 20.6 | 1.0/2.0/1.0 | 0.9/2.0/1.0 | 950 | 66.0 | 9.1 | 6.5 | 8.1 |
| 6 | DETA | 10.3 | Dodecyl [2] | 78.6 | 1.0/3.0/1.0 | 1.0/3.0/1.0 | | 74.6 | 10.3 | 4.2 | 5.2 |
| 7 | DETA | 10.3 | do | 78.6 | 1.3/3.0/1.0 | 1.6/3.0/1.0 | 2,440 | 66.6 | 9.1 | 4.3 | 9.4 |
| 8 | DETA | 10.3 | do | 78.6 | 2.0/3.0/1.0 | 1.3/2.1/1.0 | 1,100 | 67.0 | 8.8 | 5.4 | 10.0 |
| 9 | DETA | 10.3 | do | 78.6 | 3.0/3.0/1.0 | 3.0/3.0/1.0 | | 58.6 | 8.7 | 3.3 | 15.3 |
| 10 | TETA | 1.46 | Octyl | 12.35 | 3.0/6.0/1.0 | 1.5/6.0/1.0 | 1,095 | 71.2 | 9.2 | 3.2 | 5.0 |
| 11 | TEPA | 2.85 | do | 10.8 | 2.0/3.5/1.0 | 1.9/4.0/1.0 | 1,320 | 65.6 | 8.6 | 5.3 | 8.3 |
| 12 | TEPA | 2.85 | do | 21.6 | 4.0/7.0/1.0 | 2.5/6.0/1.0 | 1,880 | 67.1 | 8.8 | 4.2 | 8.7 |
| 13 | DEPA | 2.85 | do | 21.6 | 2.0/7.0/1.0 | 1.7/6.0/1.0 | 855 | 70.8 | 9.3 | 4.6 | 6.6 |
| 14 | DPTA | 1.31 | do | 6.18 | 2.0/3.0/1.0 | 2/2/1 | 3,085 | 56.8 | 7.75 | 4.85 | 14.2 |
| 15 | 1,3-PDA | 2.97 | do | 16.5 | 1.0/2.0/1.0 | 1/2/1 | 685 | 64.9 | 8.21 | 4.53 | 9.45 |
| 16 | 1,2-PDA | 2.97 | do | 16.5 | 1.0/2.0/1.0 | 1/2/1 | 1,010 | 64.95 | 9.00 | 4.95 | 10.1 |
| 17 | 1,8-ODA | 1.80 | do | 5.15 | 1.0/2.0/1.0 | 1.6/2/1 | | 65.47 | 9.38 | 4.22 | 14.2 |

[1] 37% formalin solution used in equal molar amounts to alkyl phenol.
[2] Dodecyl is a propylene tetramer.

NOTE.—EDA=Ethylenediamine. DETA=Diethylenetriamine. TETA=Triethylenetetramine. TEPA=Tetraethylenepentamine. DPTA= Dipropylenetriamine. PDA=Propanediamine. ODA=Octanediamine.

UTILITY

The salts of this invention have exhibited an ability to enhance the resistance of substantially crystalline polypropylene to photodegradation caused by exposure to ultraviolet light. Accordingly, these salts will be mixed homogeneously with such polypropylene at concentrations of at least about 0.05 wt. percent, usually about 0.05 to 0.50 wt. percent, based on the polypropylene, to enhance the photostability of the polypropylene. This mixing may be achieved by blending the polymer and salt in powder form in conventional powder blenders or by mixing them in conventional melt blenders. Minor amounts of other polymers, pigments, other photostabilizers, oxidation stabilizers, heat stabilizers, dye acceptors, dyes, fillers, and the like may also be incorporated into these mixtures.

The normally solid, substantially crystalline polypropylene which is stabilized by the salts of this invention is a well known, commercial commodity. It is normally at least about 85% crystalline. It is essentially insoluble in refluxing heptane.

The salts of the above examples were tested as photostabilizers for polypropylene by the following procedure. 0.010 g. of 2,6-di-t-butyl-p-cresol and 0.050 g. of the nickel stabilizer were dissolved in acetone and poured into 10.0 g. of a commercial, unstabilized polypropylene powder. The slurry was stirred thoroughly until absolutely dry. The slurry was them mold pressed at 475° F. and up to 30,000 p.s.i. into a 20 mil sheet. This sheet was cut into 1-inch by 2-inch samples which were exposed to an ultraviolet energy source (450 watt mercury vapor lamp). The samples were periodically examined in the 1800–1600 cm.$^{-1}$ region of the infrared spectrum for carbonyl (oxidation) buildup using an unexposed sample in the reference beam. The sample was also periodically flexed to determine whether it had failed by embrittlement. Table II reports the results of these tests. For comparison, a sample without an ultraviolet light stabilizer and samples of other phenolic nickel salts were also tested by the above procedure. These comparison tests are reported in Table II.

TABLE II

| Salt | Carbonyl buildup (Infrared absorbance) 30 hrs. | Carbonyl buildup (Infrared absorbance) 100 hrs. | Hours to brittle failure |
|---|---|---|---|
| Example No.: | | | |
| 1 | 0 | .20 | 260 |
| 2 | 0 | .15 | 295 |
| 3 | 0 | .20 | 195 |
| 4 | 0 | .80 | 163 |
| 5 | .02 | .40 | 114 |
| 6 | .03 | .61 | 115 |
| 7 | .05 | 00 | 119 |
| 8 | .05 | .80 | 115 |
| 9 | .03 | | 95 |
| 10 | 0 | | 70 |
| 11 | .04 | | 82 |
| 12 | 0 | .10 | 232 |
| 13 | 0 | .10 | 185 |
| 14 | 0 | .90 | 143 |
| 15 | 0 | .40 | 139 |
| 16 | 0 | .35 | 144 |
| 17 | .08 | | 66 |
| No UV light stabilizer | .40 | | 30 |
| Commercial [1] | .30 | | 60 |
| Ni salt of p-octyl phenol | .40 | | 28 |

[1] The nickel salt of bis(p-octylphenol)sulfide.

The nickel salts of the present invention show synergistic stabilization of polypropylene when combined with hindered phenols conventionally used as ultraviolet light stabilizers. For instance, mixtures of nickel salts of this invention with 2-hydroxy-4-octyloxybenzophenone or 2-(2'-hydroxy-3',5'-d - t - butylphenol) - 5 - chlorobenzotriazole gave better U.V. stability than the individual compounds at equal concentrations.

Although the nickel salts of N-(hydroxyalkylbenzyl) ethylene polyamines in accordance with this invention are preferred for their effectiveness in stabilization of substantially crystalline polypropylene, other metal salts are effective as shown in Table III.

The various metals were tested by preparing the corresponding organometallic stabilizer from N,N'-bis(2 - hydroxy - 5 - tetrapropylbenzyl)ethylenediamine, ($R=C_{12}H_{25}$, $R'=H$, $y=1$, and $x=1$). Each of these test compounds was mixed with polypropylene powder at a concentration of 0.50%. At the same time, 2,6-di-t-butyl-p-cresol (BHT) was also mixed in at a concentration of 0.10%. The dry mixture was pressed into 20-mm. thick sheets. These sheets were exposed to a fluorescent sun lamp-black light Weather-Ometer and analyzed periodically by infrared for carbonyl buildup. The sheets were also flexed to obtain a time to flexural failure.

TABLE III

| Test metal | Time in FS/BL Weather-Ometer (hr.) To reach 0.25 carbonyl concentration | Time in FS/BL Weather-Ometer (hr.) To flexural failure |
|---|---|---|
| Nickel | 650 | 2,000 |
| Barium | 169 | 237 |
| Cadium | 246 | 260 |
| Cobalt [II] | 165 | 488 |
| Copper [II] | 172 | >800 |
| Iron [II] | 134 | >800 |
| Lead | 194 | 285 |
| Manganese [II] | 280 | 577 |
| Mercury [II] | 195 | 268 |
| Tin [II] | 83 | 168 |
| Uranium | 229 | >800 |
| Zinc | 172 | 237 |
| Organic compound without metal | 145 | 261 |
| BHT only | 118 | 123 |

While the character of this invention has been described in detail with numerous examples, this has been done by way of illustration only and without limitation of the invention. It will be apparent to those skilled in the art that modifications and variations of the illustrative examples may be made in the practice of the invention within the scope of the following claims.

I claim:
1. Composition comprising normally solid, substantially crystalline polypropylene and divalent metal salt of polyamines having the general structure illustrated by formulae selected from the group consisting of

(I)
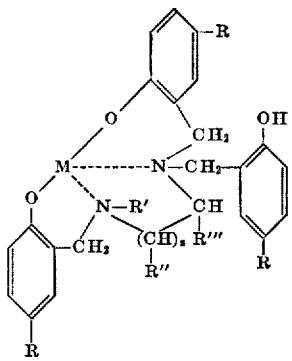

(II)
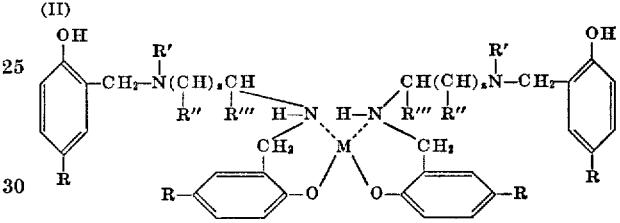

wherein M is divalent metal, R is an alkyl group of about 5 to about 15 carbon atoms; R' is H or

R" and R'" which may be alike or different are H or alkyl groups having less that 5 carbon atoms each; z is an integer in the range of 1 to 12; and the number of mols of divalent metal per mol of salt is in the range of about 0.5 to 3.5, inclusive, said divalent salt being present in an amount sufficient to enhance the photostability of the polypropylene.

2. Composition comprising normally solid, substantially crystalline polypropylene and nickel salt of the formulae of claim 1 in an amount sufficient to enhance the photostability of the polypropylene.

3. Composition comprising normally solid, substantially crystalline polypropylene and at least about 0.05 wt. percent of the nickel salt of the polyamine of claim 2.

4. Composition comprising normally solid, substantially crystalline polypropylene and about 0.05 to about 0.5 wt. percent of the nickel salt of the polyamine of claim 2.

5. Composition comprising normally solid, substantially crystalline polypropylene and divalent metal salt of polyamines having the formula

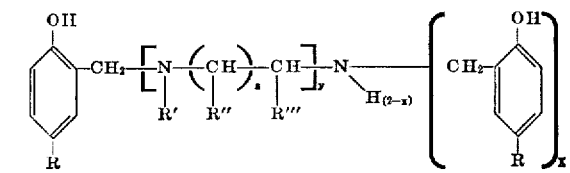

wherein R is an alkyl group of about 5 to about 15 carbon atoms; R' is H or

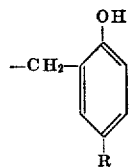

R'' and R''' which may be alike or different are H or alkyl groups having less than 5 carbon atoms each; $z$ is an integer in the range of 1 to 12; $y$ is an integer in the range of 1 to 4; $x$ is 0, 1 or 2 and the number of mols of divalent metal per mol of salt is in the range of about 0.5 to 3.5, inclusive, said divalent salt being present in an amount sufficient to enhance the photostability of the polypropylene, and the divalent metal of said salt being principal valence bonded entirely to the phenolic oxygen.

References Cited
FOREIGN PATENTS
994,260  6/1965  Great Britain _____ 260—45.75

DONALD E. CZAJA, Primary Examiner
V. P. HOKE, Assistant Examiner

U.S. Cl. X.R.

260—45.75 R, 45.75 C, 45.75 K, 45.8 A, 45.9 R, 45.95, 429 J, 429.1, 429.7, 429.9, 433, 435 R, 438.1, 439, 570.5, 570.6